US006266305B1

(12) United States Patent
Büchler

(10) Patent No.: US 6,266,305 B1
(45) Date of Patent: Jul. 24, 2001

(54) DEVICE FOR READING FROM AND/OR WRITING TO OPTICAL RECORDING MEDIA

(75) Inventor: Christian Büchler, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/090,045

(22) Filed: Jun. 3, 1998

(30) Foreign Application Priority Data

Jun. 5, 1997 (DE) .............................................. 197 23 542

(51) Int. Cl.[7] ........................................................ G11B 7/00
(52) U.S. Cl. ........................ 369/44.32; 369/47; 369/280; 369/53; 369/350
(58) Field of Search .............................. 369/44.32, 44.42, 369/124.13, 124.14

(56) References Cited

U.S. PATENT DOCUMENTS

| 3,591,292 | * | 7/1971 | Feuchter ............................. 359/141.5 |
| 4,057,833 | * | 11/1977 | Braat ................................... 369/44.42 |
| 4,375,088 | * | 2/1983 | de Haan et al. .................... 369/48 X |
| 4,541,082 | * | 9/1985 | Horikoshi et al. ................. 369/46 X |
| 4,740,940 | | 4/1988 | Tanaka et al. ......................... 369/44 |
| 4,785,441 | | 11/1988 | Tanaka et al. ......................... 369/44 |
| 4,807,211 | * | 2/1989 | Getreuer ............................. 369/44.13 |
| 5,060,216 | | 10/1991 | Suzuki et al. ...................... 369/44.41 |
| 5,073,886 | * | 12/1991 | Sasaki et al. ..................... 369/124.14 |
| 5,258,968 | | 11/1993 | Matsuda et al. .................. 369/44.35 |
| 5,406,542 | * | 4/1995 | Morimoto ............................. 369/120 |
| 5,986,999 | * | 11/1999 | Takahashi et al. .......... 369/124.14 X |

FOREIGN PATENT DOCUMENTS

| 2701539 C2 | 8/1977 | (DE) ................................ G11B/7/08 |
| WO98/01855 | 1/1998 | (WO) .............................. G11B/7/09 |

OTHER PUBLICATIONS

Patent Abstracts of Japan, vol. 012, No. 388, (P–771), Oct. 17, 1988 and JP 63 131334A, Pub. date Jun. 3, 1988.
Patent Abstracts of Japan, vol. 014, No. 325, (P–1075), Jul. 12, 1990 and JP 02108244A, Pub. date Apr. 20, 1990.

* cited by examiner

Primary Examiner—Aristotelis M. Psitos
(74) Attorney, Agent, or Firm—Joseph S. Tripoli; Paul P. Kiel

(57) ABSTRACT

The present invention relates to a device for reading from and/or writing to optical recording media, which has a tracking unit, a four-quadrant detector, two summation points and a phase comparator for tracking in accordance with the differential phase detection method, and also two variable delay elements which can be set by a control unit. The device has improved compensation of the error in the track error signal and thus in the tracking signal. The error is caused by lens movement. An interference signal generating unit whose output is connected to the tracking unit and to a first input of the control unit, the second input of which is connected to the output of the phase comparator for providing error compensation.

20 Claims, 8 Drawing Sheets

DEVICE FOR READING FROM AND/OR WRITING TO OPTICAL RECORDING MEDIA

The present invention relates to a device for reading from and/or writing to optical recording media, which device has variable delay elements, according to the preamble of Claim 1, and also to a method for setting the delay times of the delay elements.

A device of this type is disclosed in U.S. Pat. No. 4,785,441. In this known device, errors in the tracking signal which are caused by tilting of the optical recording medium or by different pit depths in the optical recording medium are compensated for by altering the delay times of the variable delay elements on the basis of a phase comparison carried out during operation.

The known device may be regarded as having the disadvantage that although errors caused by tilting of the optical recording medium or by different pit depths of the optical recording medium can be compensated for relatively well, the nature of the detection of an error caused by lens displacement is not optimal. This is due to the fact that error portions from other error sources, for example changes in the component properties caused by ageing or changing environmental conditions, also have an influence. This leads to the compensation actually not being optimal.

The object of the present invention is to propose a device which has the best possible compensation of the error in the track error signal and thus in the tracking signal, which error is caused on account of the lens movement.

This object is achieved according to the invention by means of the features specified below. In this case, an artificial interference signal is fed to the tracking unit, the track error signal caused thereby is compared with the interference signal and the result is fed to the control unit. This has the advantage that errors in the track error signal which are caused by lens deflection are optimally compensated for. The interference signal generating unit effects a deflection of the lens and thus an error in the track error signal, the output signal of the phase comparator. This error is not compensated for as long as the tracking control loop is not closed. An error caused by the lens deflection is thus initially manifested without any compensation in the track error signal. The interference signal and the track error signal are compared by means of the control unit and the delay times of the variable delay elements are set optimally using the result of this comparison. This means that after setting no or only a very weak residual influence of the interference signal remains in the track error signal.

In accordance with a first variant according to the invention, two further delay elements having a fixed delay time are provided, with the result that each detector element is assigned a delay element. By shortening or prolonging the delay times of the variable delay elements in comparison with those of the fixedly set delay elements, it is possible to delay the output signals of one as well as the other pair of detector elements relative to the respective other pair. This has the advantage that great variability can nevertheless be obtained by means of a small number of delay elements.

According to the invention, a further variant provides for a variable delay element to be assigned to each of the detector elements of the four-quadrant detector, and also for a switching unit to be provided which serves for connecting a respective detector element pair to a control output of the control unit. This has the advantage that the setting of the delay times which are suitable for optimal compensation is simplified since the output signals in each case of the more suitable pair of detector elements are temporally delayed by means of the associated delay elements. Delay elements which are constructed more simply and are thus more cost-effective can be used here, in accordance with a first embodiment, since all the delay elements can be designed to be adjustable only in one direction. That is to say their variable delay time is increased proceeding from a start value, preferably zero. In doing this, it is not necessary to proceed from an average start value of the delay from which the delay time can then be increased or decreased. Equipping each detector element with a variable delay element makes it possible, moreover, not only to compensate for an error caused by lens deflection but also to compensate for an offset in the track error signal or other adaptations, for example to undesirable delays caused by component tolerances, or similar interfering influences.

Another possibility according to the invention, which is to manage only with two variable delay elements, consists in respectively connecting these elements by means of a switching unit to the detector elements whose signals are to be delayed. This has the advantage that the delay times of the delay elements need to be altered only in one direction, for example exclusively prolonged.

The control unit advantageously has a comparison unit, to whose inputs the output signal of the phase comparator and the output signal of the interference signal generating unit are applied, the output signal of the comparison unit serving for setting the variable delay elements. This has the advantage that the comparison unit provides both a direction signal, which indicates whether the delay to be set must be positive or negative, or which pair of detector elements is to be delayed, and an absolute value signal, which indicates the magnitude of the required delay. The comparison unit advantageously has a synchronous demodulator.

According to a further advantageous refinement of the device, the control unit has an offset determining unit, to whose input the output signal of the phase comparator is applied, and whose output signal serves for setting the variable delay elements. This has the advantage that an offset possibly present in the track error signal is likewise compensated for by the setting of the delay times of the delay elements. For this purpose, the track error signal is advantageously integrated and the pair of detector elements to be delayed as well as the magnitude of the required delay are determined from the sign and absolute value of the output signal of the integrator.

The two error compensation units for offset and for errors caused by lens deflection are advantageously combined in order to be able to generate a track error signal which is as error-free as possible.

The invention provides for at least one of the delay elements to be arranged between a summation point for output signals of the detector elements of the four-quadrant detector and the phase comparator. This has the advantage that the offset compensation is effected with delay elements which are independent of the compensation of the lens movement.

In this case, the invention provides both solutions with two variable delay elements and a simple switching unit, and solutions with a single delay element and a somewhat more complicated switching unit. This has the advantage that, depending on the given boundary conditions, it is possible to realize the version which is the most favourable in each case in cost terms or as seen from the production outlay. In general, solutions with a small number of delay elements are preferable here since they take up a small chip area when realized as an integrated circuit.

The invention furthermore provides for an output signal of the control unit to be split up into absolute value and sign by means of a circuit block. This has the advantage that, for example, the sign signal can be used directly for driving a switching unit which, consequently, receives a quasi-digital driving signal of defined amplitude. Furthermore, this makes it unnecessary to effect sign determination e.g. in the case of the delay elements.

A particularly advantageous refinement in particular of the detection arrangement of the device according to the invention is specified below. This refinement has the advantage that detection arrangements and control units for setting the delay elements and thus for compensating for systematic errors in the track error signal are coordinated with one another particularly well.

A further object of the invention is to specify a method for a device of this type which enables the best possible compensation of the error in the track error signal, which error is caused on account of the lens movement.

In accordance with the inventive method for setting the delay times of delay elements of a device for reading from and/or writing to optical recording media, which device has a tracking unit, the delay elements being arranged between detector elements of a four-quadrant detector and a unit for determining a track error signal the following method steps are carried out:

a) the tracking control loop is opened, b) an interference signal is fed to the tracking unit, c) the track error signal and the interference signal are compared with one another, d) the delay times of delay elements which are assigned to two neighbouring detector elements are jointly changed, e) if the components of the interference signal in the track error signal lie above a specific limit value, then step d) is carried out anew, f) the interference signal is interrupted, g) the delay times determined are retained.

This has the advantage that errors possibly present in the track error signal can be optimally compensated for. As a result of the impressed interference signal, the effects of this error are enhanced and can thus be identified and compensated for more easily. Moreover, the compensation is effected more accurately since even small influences caused by the interference signal are identified. On the other hand, influences in the tracking signal which are not caused by the interference signal are identified in the comparison and not used for the compensation.

The delay times determined are, if appropriate, stored so that they can be called up again after a disturbance, for example. A further advantageous development of the invention consists in storing the delay times determined together with an identification information item of the respective recording medium, so that following future renewed insertion of this specific recording medium into the device, the delay times matched to this specific recording medium can immediately be set.

The invention provides for the interference signal to be a periodic signal. This has the advantage that the comparison can thus be realized in a simple manner. However, it likewise lies within the scope of the invention to use a predetermined non-periodic signal which, if appropriate, is matched to the device properties.

The tracking signal is advantageously compared with the phase-shifted interference signal. This has the advantage that compensation of the reaction time of the tracking unit to the interference signal is effected by the phase shift. This reaction time is generally device-specific and is taken into account in the construction of the device. Adaptive matching of the phase shift, particularly given a predetermined non-periodic signal as well, is likewise advantageously possible. Other delay times that occur and may be caused for example by low-pass filter properties of individual elements are also compensated for by the phase shift.

According to the invention, the frequency of the periodic signal is preferably below a resonant frequency of the tracking unit. This has the advantage that interfering influences as a result of incipient resonance phenomena do not occur. The greater the distance between the frequency of the interference signal and the resonant frequency, the better it is since then no phase shifts or only negligibly small phase shifts occurring already in the vicinity of the resonant range can become apparent. The resonant frequency of the actuator of the tracking unit cannot, in general, be specified, since it depends on device properties. If the frequency of the interference signal is below 10 Hz then a sufficient distance from the resonant frequency is generally afforded, however. The frequency of the interference signal should also not be too small since otherwise the reaction time is too long, which has an adverse effect on the setting. According to the invention, therefore, the frequency of the interference signal is chosen to be greater than 2 Hz. In principle, it is likewise possible to choose for the periodic signal a frequency which is above the resonant frequency and is at an appropriate remove from the resonant frequency or the resonant frequencies of the tracking unit.

The invention provides for the following steps to be executed in the context of a method wherein:

a) the tracking control loop is opened, b) an interference signal is fed to the tracking unit, h) the track error signal is checked for the presence of an offset, k) given the presence of an offset, the delay time of one or a plurality of detector elements which are assigned to two diagonally opposite delay elements is jointly changed, l) if the value of the offset lies above a predetermined limit value, then step k) is carried out anew, f) the interference signal is interrupted, and g) the delay times determined are retained.

This has the advantage of enabling offset compensation in the track error signal to be performed in a simple manner. In this case, the pair of detector elements whose delay times are changed is selected in accordance with the sign of the offset, or the change direction is selected in the case of a stationary pair.

Here, too, the retention of the delay times determined may advantageously comprise storing these delay times that have been determined.

In principle, the offset compensation can also be carried out when the actuator is stationary, that is to say not moved by the tracking unit, since track crossings always occur on account of a minimum disk eccentricity that is always present. Consequently, it is also possible to dispense with feature b). In order to determine the offset, a low-pass filter is provided whose cut-off frequency is distinctly less than the frequency caused by the track crossings. Dispensing with feature b) thus results in a relatively long measurement time. If the actuator is additionally moved in accordance with feature b) then the frequency caused by the track crossings is increased. As a result, it is also possible to increase the cut-off frequency of the low-pass filter, reduce the settling time and thus shorten the measurement time.

The invention furthermore provides for the method steps c) to e) and h) to l) to be executed successively or, alternatively, nested one in the other. This has the advantage that it is possible to mix the methods for offset compensation and for lens movement compensation, as a result of which any reciprocal influences of the two methods on one another are precluded or immediately concomitantly compensated for.

In the case of nested processing of the two compensation operations, it is generally not possible to interrupt the movement of the actuator momentarily, i.e. to omit feature b).

The changing of the delay times is preferably carried out as follows: the delay times determined from offset measurement and for compensating for the lens movement are added together if the driving curve of the delay elements is linear. If the said curve is nonlinear, the driving values are linearized with regard to the delay elements.

It goes without saying that the invention is not restricted to the concretely specified exemplary embodiments and alternatives, but rather includes all developments within the ability of the person skilled in the art. Further advantages and further refinements of the invention can be found in the following description of exemplary embodiments with reference to the drawings, in which.

Figure 3:
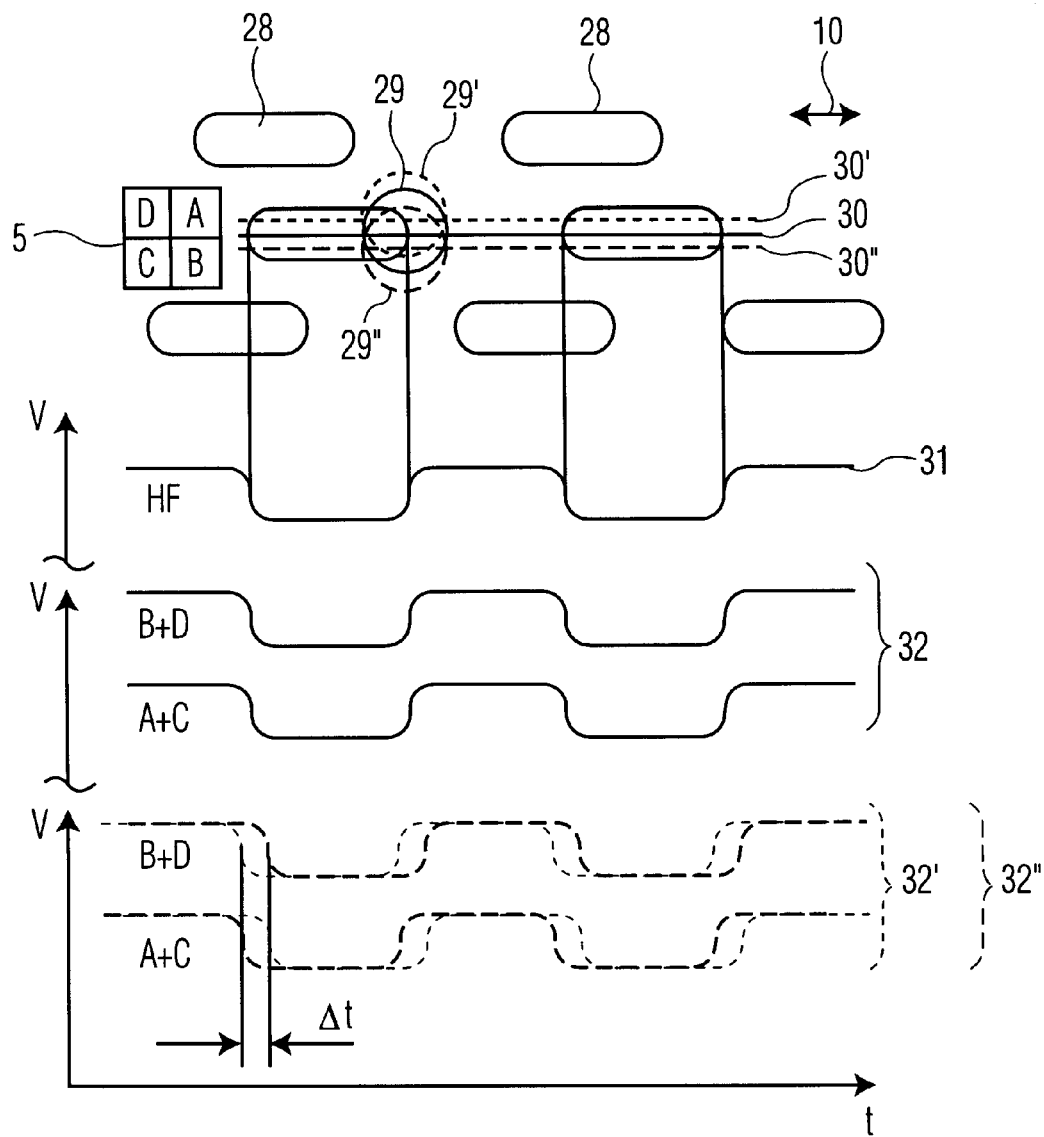
Figure 4:
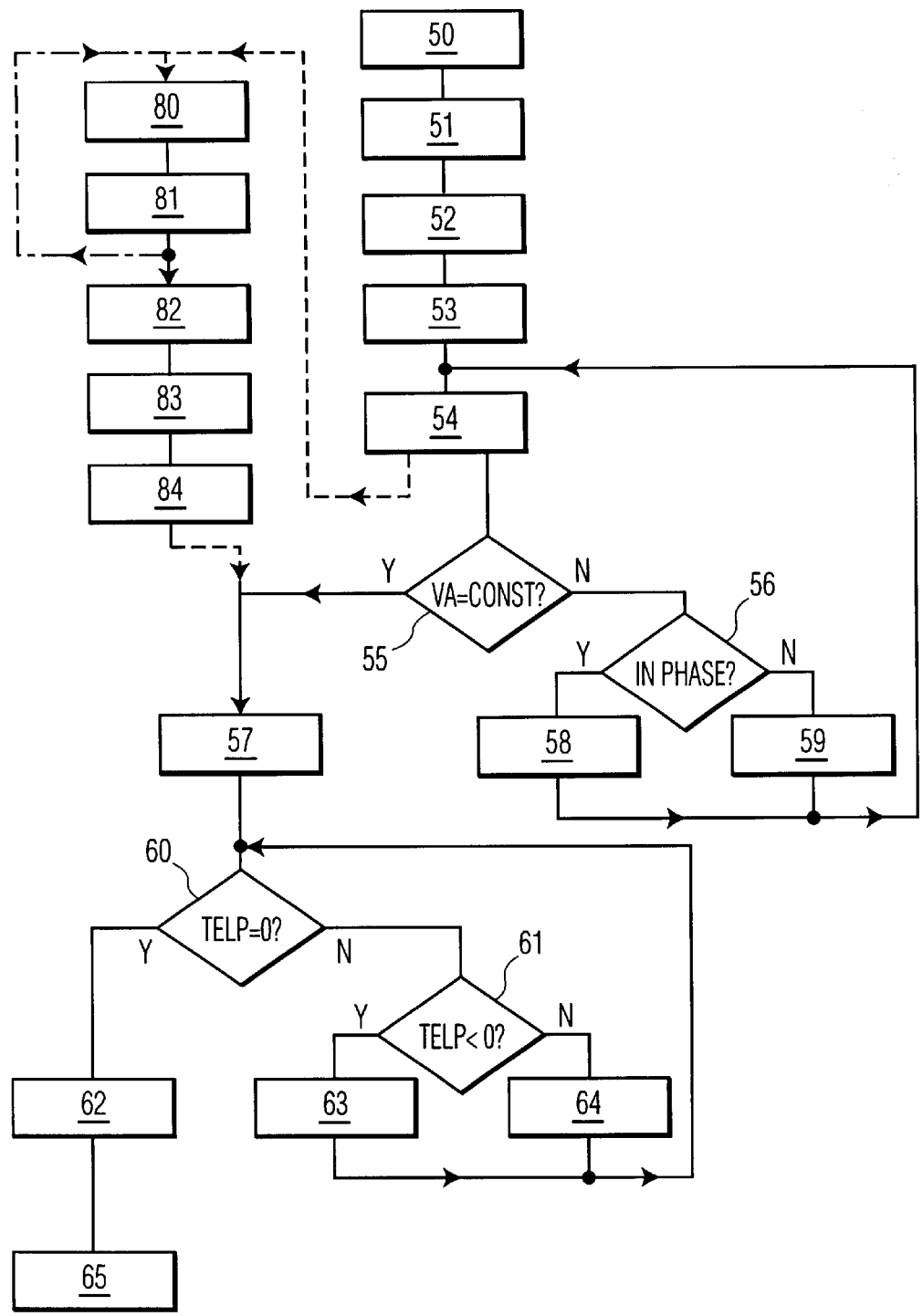
Figure 5:
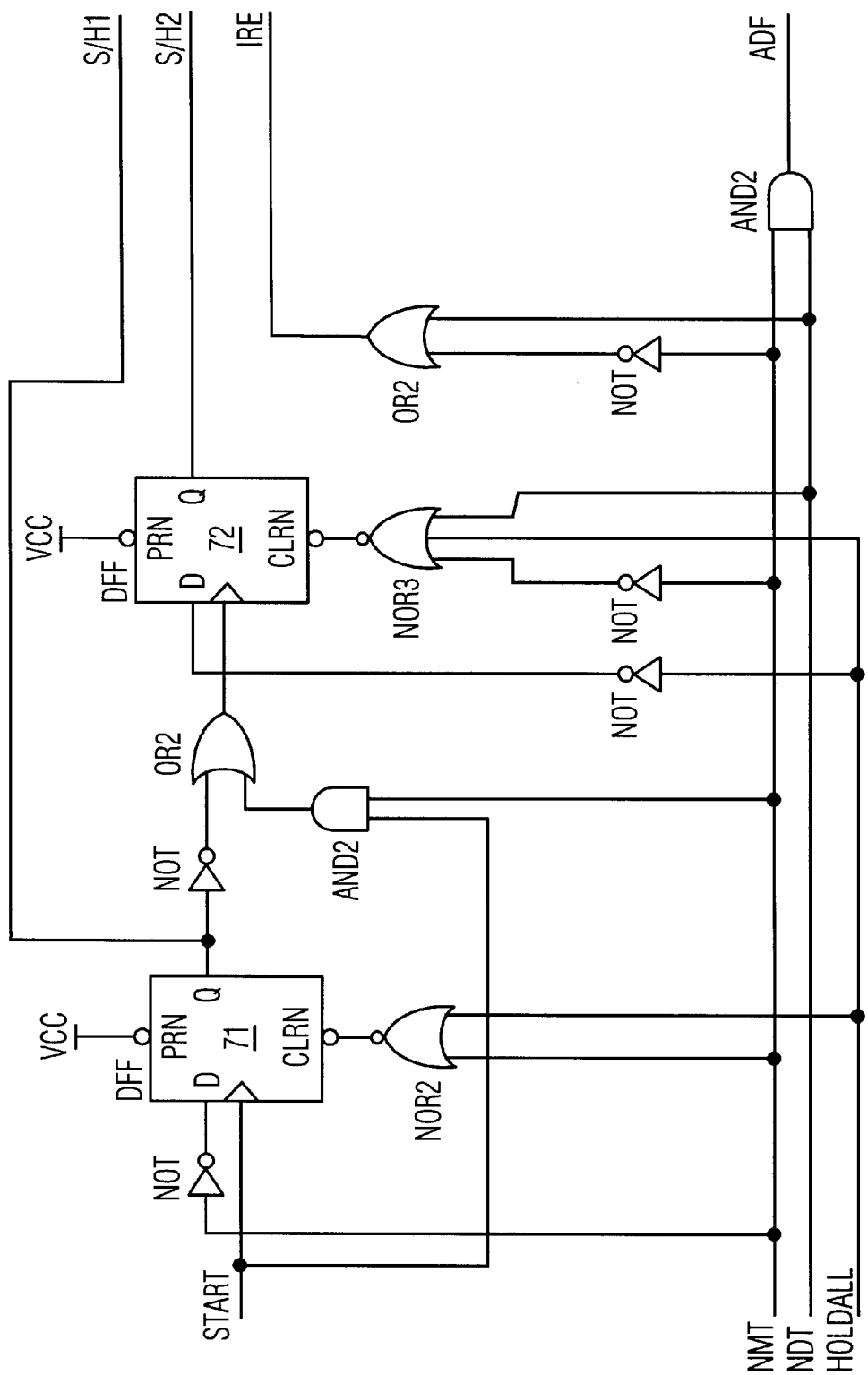
Figure 6:
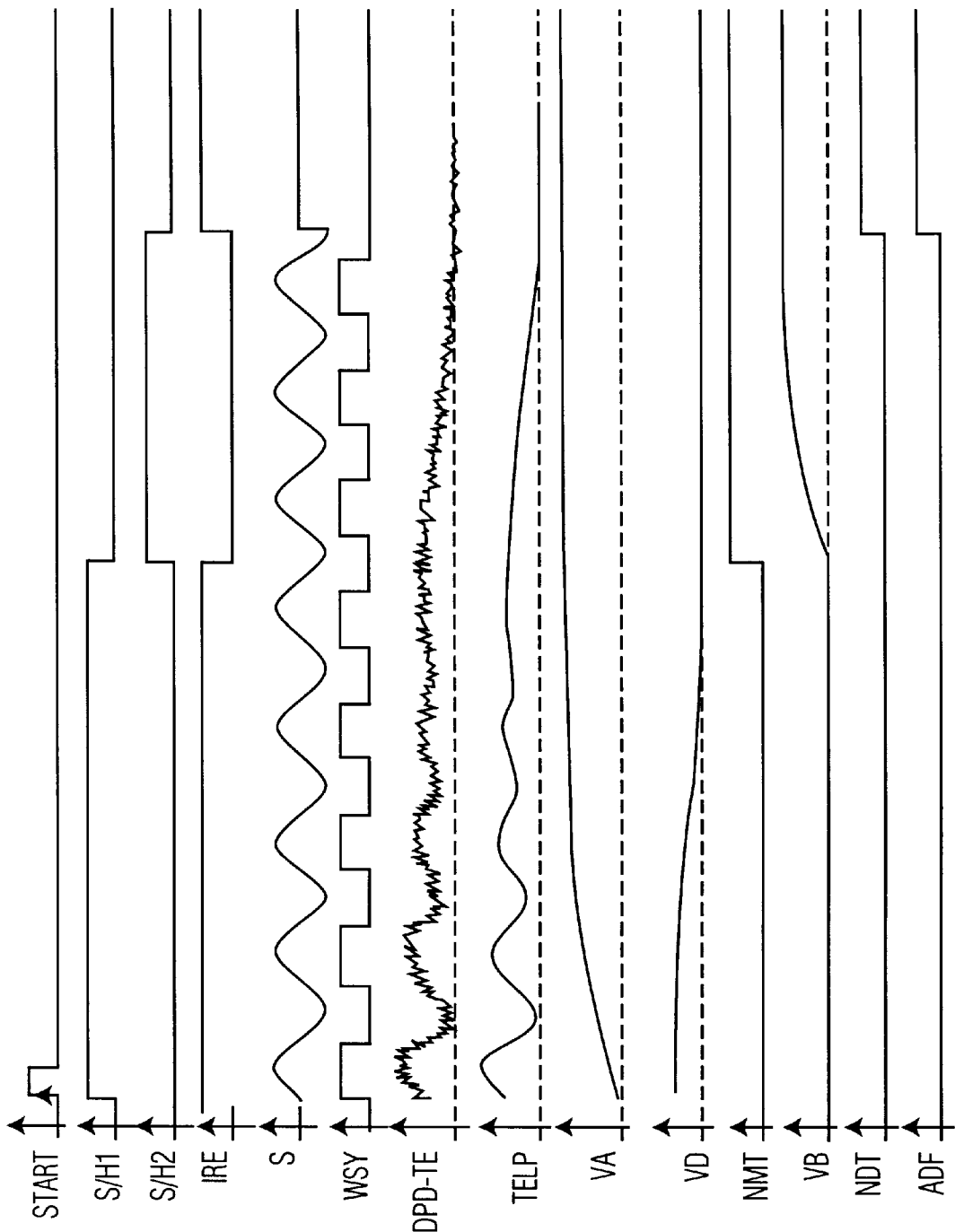
Figure 7:
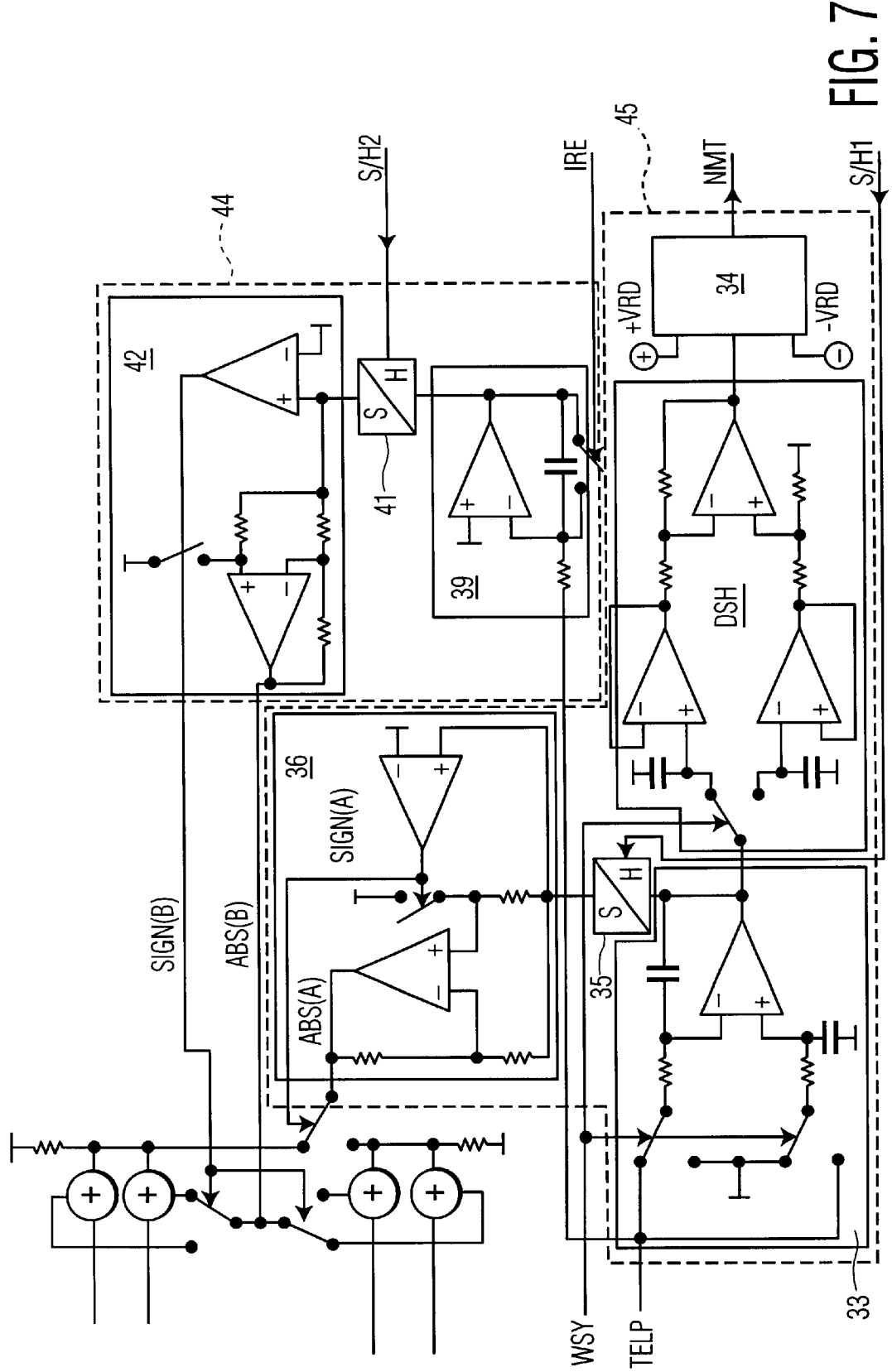
Figure 8:
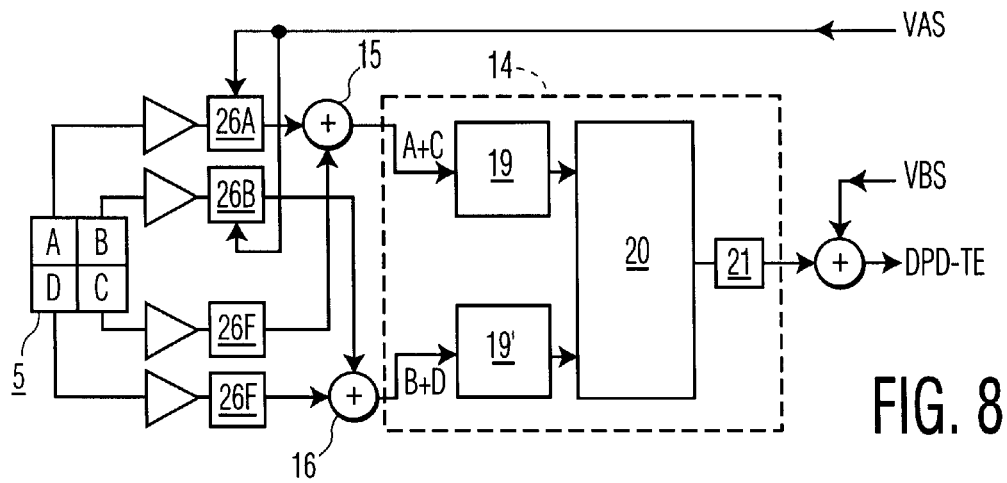
Figure 9:
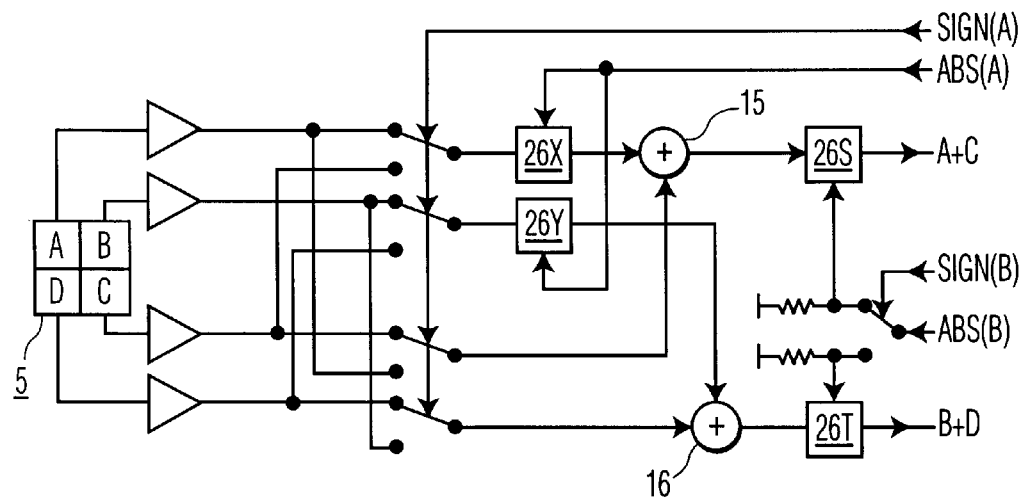
Figure 10:
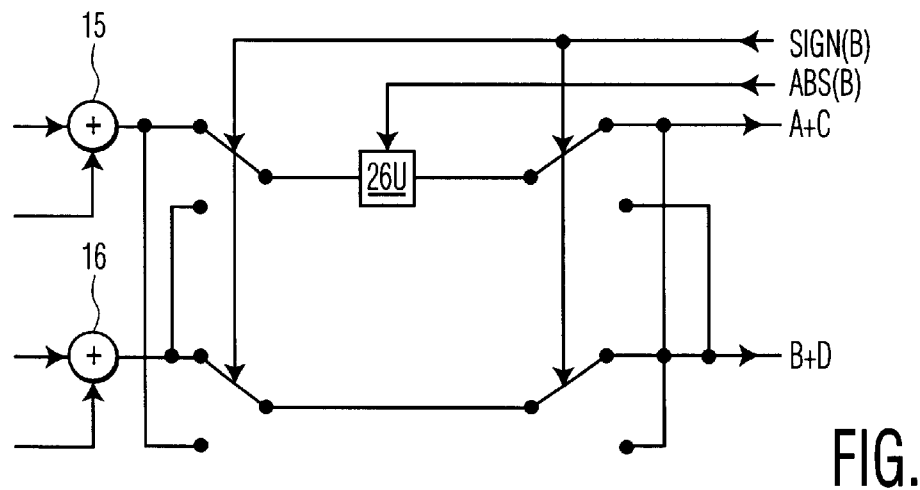

FIG. 3 shows the phase relationship of the individual detector signals when the DPD tracking method is employed, FIG. 4 shows a flow diagram of the method according to the invention, FIG. 5 shows a logic control of a device according to the invention, FIG. 6 shows a signal diagram relating to the method according to the invention, FIG. 7 shows a design of the control unit, FIG. 8 shows part of a device according to the invention in a further embodiment with two variable and two fixed delay elements, FIG. 9 shows part of a device according to the invention in a further embodiment with four variable delay elements, and FIG. 10 shows part of a device according to the invention in a further embodiment with a variable delay element for offset compensation.

Figure 1:
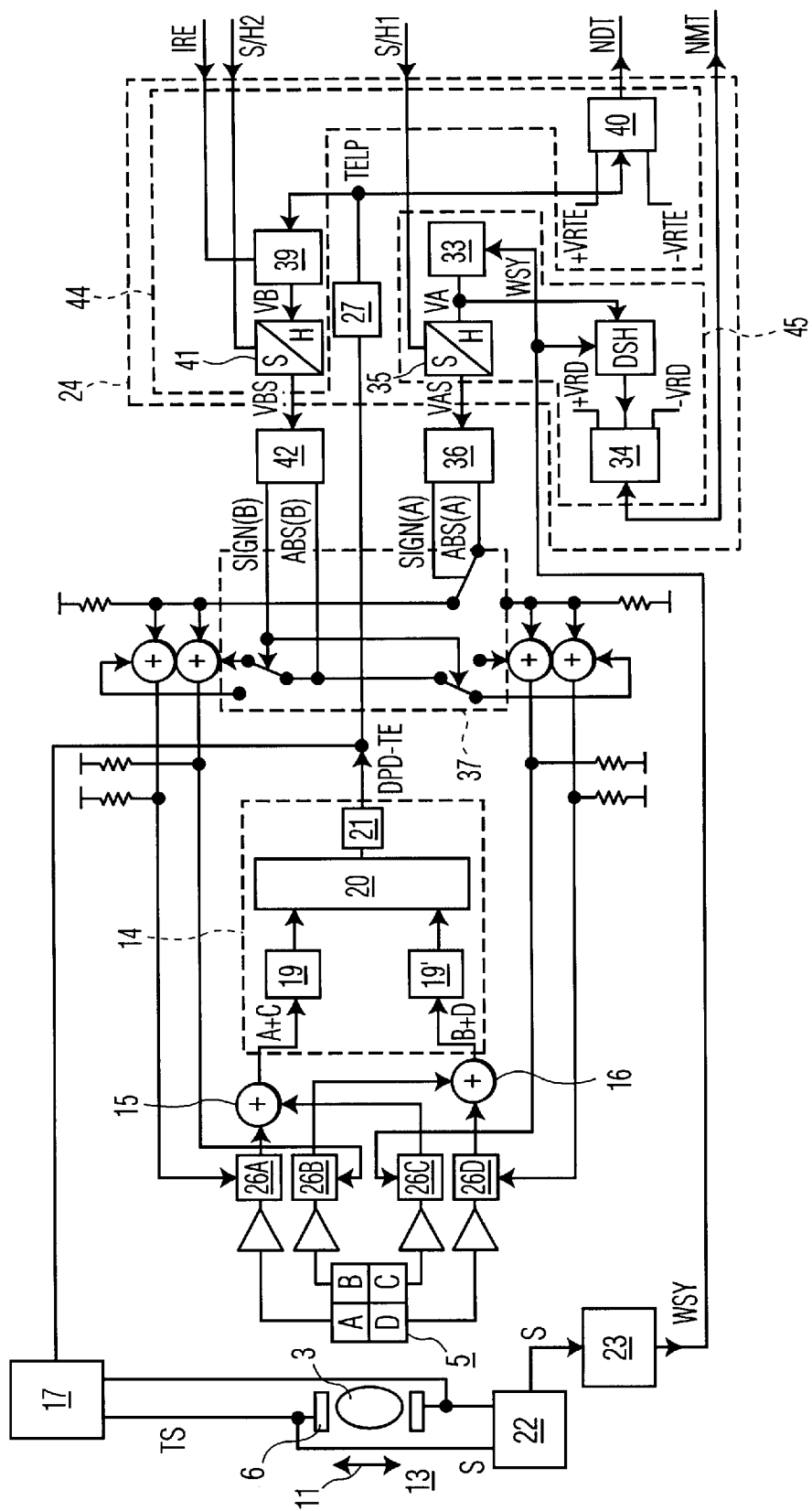
FIG. 1 shows an exemplary embodiment of a device according to the invention.

FIG. 1 shows a device according to the invention. A tracking unit 13 is illustrated on the left-hand side, an objective lens 3 and a Vernier drive 6 belonging to the said tracking unit. The Vernier drive 6 is driven by the tracking regulator 17, to whose input the track error signal DPD-TE output by a phase detector 14 is applied. On the other hand, an interference signal S is applied to the Vernier drive 6 by an interference signal generating unit 22. The interference signal S is phase-shifted by means of a phase shifter 23 to form the signal WSY and fed to a control unit 24. The control unit 24 evaluates the signal WSY and the track error signal DPD-TE and sets the delay times $\tau_A, \tau_B, \tau_C$ and $\tau_D$ of the variable delay elements 26A, 26B, 26C, 26D via a switching unit 37. The variable delay elements 26A, 26B, 26C, 26D delay the signals output by the detector elements A, B, C, D of the four-quadrant detector by the respectively set delay times $\tau_A, \tau_B, \tau_C$ and $\tau_D$. The thus-delayed signals of the detector elements A and C are summed at a first summation point 15 and forwarded to the phase detector 14.

The same applies correspondingly to the delayed signals of the detector elements B and D and also to the summation point 16.

Figure 2:
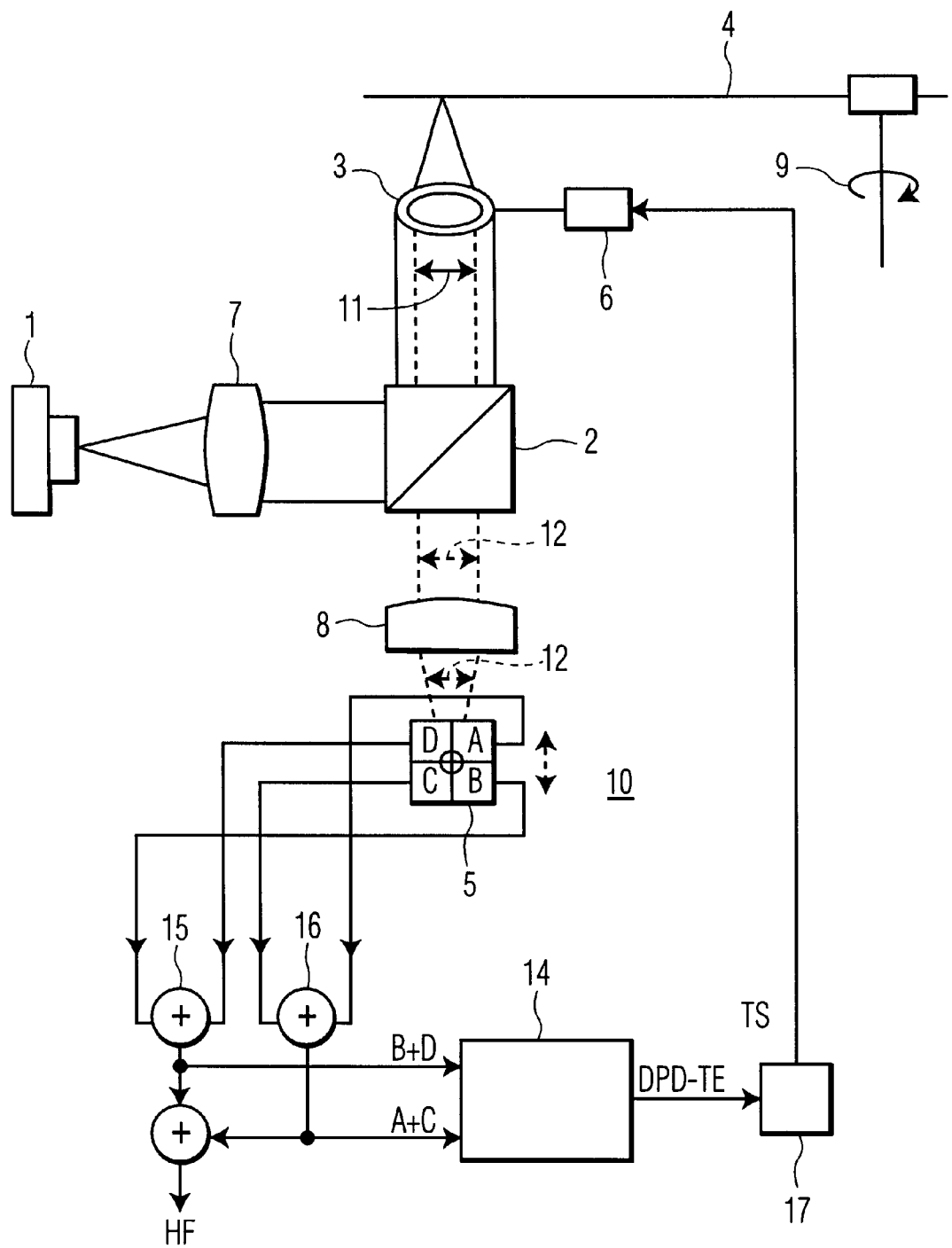
FIG. 2 shows a known device using the DPD tracking method.

The DPD tracking method will now be explained with reference to FIG. 2. FIG. 2 shows a diagrammatic illustration of a known device which utilizes the DPD tracking method. A light source 1 produces a light beam which is focused onto an optical recording medium 4 via a semi-transparent mirror 2, which is illustrated as part of a polarizing beam splitter, and an objective lens 3. The light beam is reflected from the optical recording medium 4 and directed onto a four-quadrant detector 5. The four-quadrant detector 5 is represented tilted through 90°, that is to say in plan view, and comprises four detector elements A, B, C and D. The arrow 10 indicates the track direction, that is to say the direction in 1which the recording medium 4 moves relative to the four-quadrant detector 5. The four-quadrant detector 5 can thus be divided into two detector areas which are located laterally with respect to the track direction and comprise the detector elements A and B, on the one hand, and also C and D, on the other hand.

A collimator 7 is arranged between the light source 1 and the mirror 2, and a convex lens 8 is arranged between the mirror 2 and the four-quadrant detector 5. A Vernier drive 6 moves the objective lens 3 in the radial direction with regard to the optical recording medium 4 in accordance with a Vernier drive actuating signal TS. The objective lens 3 and the Vernier drive 6 are part of the tracking unit 13. The recording medium 4 is designed as a disc, for example in accordance with an audio compact disc (CD), a video disc, a recording medium having a high recording density (DVD) or the like. The optical recording medium 4 is made to rotate by means of a disc drive 9 that is indicated only diagrammatically here. A sect-ion through the recording medium 4 along a diameter is illustrated. The light beam focused onto the recording medium 4 by the objective lens 3 is located in the radially outer region of the recording medium 4. The displacement direction of the beam, reflected from the optical recording medium 4, after passing through the objective lens 3, which is caused by the displacement of the objective lens 3 effected by the Vernier drive 6, is indicated by the arrows 12. The arrow 11 represents the direction of movement of the lens 3.

The outputs of the detector elements A and C are connected to a first summation point 15, and the outputs of the detector elements B and D are connected to a second summation point 16. The corresponding summation signals A+C and B+D are fed to a phase detector 14, a track error signal DPD-TE determined by the DPD method being present at the output of the said phase detector.

The outputs of the summation points 15 and 16 are connected to the inputs of a further summation point 18. Thus, the sum of the signals of all the detector elements A, B, C and D is present at the output of the summation point 18. This signal is the information signal HF which, in order to be converted into signals which can be evaluated for the user, is passed on to an evaluation unit (not illustrated here).

In order to describe the functioning of the device according to the invention, reverence will firstly be made to FIG. 1, where the structure of the phase detector 14 is diagrammatically explained. The inputs of the phase detector 14 are connected to a respective converter 19 and 19', whose outputs are connected to the inputs of a phase comparator 20. The output of the phase comparator 20 is connected via a low-pass filter 21 to the output of the phase detector 14, at which the track error signal DPD-TE determined by means of the DPD method is present. The first input of the phase detector 14 is connected to the output of the summation point 15, to whose inputs the output signals of the detector elements A and C are applied. The second input of the phase detector 14 is connected to the output of the summation point 16, whose inputs are connected to the detector elements B and D.

The signals of the detector elements A and C are added at the summation point 15, and the summation signal is brought to logic level in the converter 19, which acts as a zero crossing comparator. A corresponding digitized summation signal B+D is formed by means of the summation point 16 and the converter 19'. These two signals are fed to the phase comparator 20, which evaluates the time interval between the two signals. The track error signal DPD-TE is the average value of these time differences and is formed by the low-pass filter 21. If the scanning point or spot 29, as explained below with regard to FIG. 3, follows the track centre 30 exactly, then the zero crossings of the summation signals A+C and B+D take place simultaneously and the resultant track error is zero. If the spot 29 follows the track with a constant deviation from the track centre, then the zero crossing of these summation signals no longer occurs simultaneously, but rather in a manner shifted in time with respect to one another. On average, the time difference that occurs is approximately proportional to the deviation of the scanning from the track centre, it being possible for the time difference with regard to one of the signals to be positive or negative. The sign of the time difference thus comprises the direction, whereas the absolute value comprises the magnitude of the deviation.

FIG. 3 shows, in its upper part, a diagrammatic, greatly enlarged detail of the information layer of the optical recording medium 4 in plan view. Three tracks located next to one another are evident, of which two or three of the depressions, the so-called pits 28, which form them and are extended in an elongate manner in the track direction are illustrated. Both the distances between the pits 28 in the track direction and their length in the track direction (arrow 10) may deviate, within specific limits, from the conditions that are represented here. This depends on the modulation method used to convert the information to be stored into the pit pattern, and on the content of the recorded information items. In particular, the pits 28 may have different lengths.

A four-quadrant detector 5, which is located symmetrically with respect to the track centre 30 of the middle track and has the detector elements A, B, C and D is indicated to the left of the pits 28. This serves to illustrate how the output signals of the detector areas A, B, C and D behave when the light spot 29 falling onto the information layer is displaced from the track centre 30.

In the lower region of FIG. 3, the amplitudes of several combinations of the output signals of the detector areas A, B, C and D are plotted against the time axis t, the time axis t corresponding to the space axis in the track direction in the event of a movement of spot 29 and optical recording medium in the track direction (arrow 10) relative to one another at normal read-out speed.

The curve 31 represented directly below the pits 28 shows the information signal HF, that is to say the sum of the signals of all the detector elements A, B, C and D. As long as the spot 29 impinges on none of the pits 28, the amplitude of the information signal HF is large. As soon as the spot 29 moves onto one of the pits 28, the amplitude decreases on account of destructive interference and reaches a minimum as soon as maximum overlapping of spot 29 and pit 28 is reached.

The curves 32 show a combination of the signals A+C and B+D without a track error, that is to say when the spot 29 is centred with respect to the track centre 30, or when there is no deflection of the objective lens 3. The curves 32' (dotted) and the curves 32" (dashed) show the temporal shift of the summation signals A+C and B+D as a function of the lens displacement or of the deviation of the spot 29' and of the spot 29" from the track centre 30 in the direction of the displaced scanning track 30" and 30", respectively. Since both a deviation from the track centre and a lens displacement lead to the same result, it is not possible to separate the two dependencies. The temporal shift Δt of the signals A+C and B+D with respect to one another corresponds in terms of its absolute value to the magnitude of the deviation of the displaced scanning track 30', 30" from the track centre 30, and in terms of its sign to the direction of the corresponding deviation. The phase detector 14 determines from this—as described above—the track error signal DPD-TE.

It may be noted that depending on the optical structure, the signals of the detector areas A, B, C and D may already have temporally static shifts with respect to one another when there is no track deviation or lens deflection. The shifts of B+D in comparison with A+C shown in the curves 32' and 32" are, however, typical in the event of lens deflection or deviation from the track centre.

Since the objective lens 3 must be able to move in the horizontal direction, that is to say perpendicularly to the direction of the tracks of the recording medium 4, the result of deflection in the horizontal direction on account of the beam geometry is wandering of the reflected image of the disc information surface on the four-quadrant detector 5 as well. It is thus a particular property of the DPD tracking method that as a result of these time differences on account of the lens movement, a track error signal DPD-TE which is not zero is produced even when the spot 29 follows the track centre 30 exactly.

By deliberately temporally delaying the signal of one or more detector elements A, B, C, D before the addition thereof at the summation points 15 and 16, it is possible to achieve compensation of the offset in the track error signal DPD-TE that is caused on account of the lens movement. The device according to the invention and also the method according to the invention make it possible to achieve the best possible compensation of this offset on account of the lens movement by adjusting the delay times $\tau_A$, $\tau_B$, $\tau_C$ and $\tau_D$ of the variable delay elements 26A, 26B, 26C and 26D.

The functioning of an exemplary embodiment of a device according to the invention will now be described with reference to FIG. 1. An offset is formed in the track error signal DPD-TE as a result of the movement of the objective lens 3 parallel to the surface of the recording medium 4 perpendicular to the track direction, that is to say in the direction of the arrow 11. According to the invention, the Vernier drive 6 is driven by means of a sinusoidal interference signal S from the interference signal generating unit 22. As a result, the objective lens 3 is moved by a certain mechanical travel about its mechanical zero position; this is also referred to as the objective lens 3 being wobbled.

In this case, the driving frequency can be freely selected within certain limits. Approximately 2–10 Hz are practical since if the frequency is too slow, the measurement time or integration time becomes too long, as described further below with regard to the control unit 24, and if the frequency is too high, one approaches the not precisely specified natural resonance of the tracking unit. If the objective lens 3 is then deflected, modulation of the envelope of the track error signal DPD-TE occurs given incorrect setting of the delay times $\tau_A$, $\tau_B$, $\tau_C$ and $\tau_D$ of the delay elements 26A, 26B, 26C and 26D.

The tracking unit 13 follows the excitation by the interference signal S with a time delay. In order to determine the modulation of the track error signal DPD-TE, a low-pass filter 27 having a low cut-off frequency is used. The zero crossings of the modulation on the low-frequency component of the track error signal, of the signal TELP, which component is used for the evaluation, are shifted in time with respect to the zero crossings of the interference signal S. This phase shift is compensated for by means of the phase shifter 23, whose phase shift is chosen such that it corresponds to the phase shift caused by the tracking unit 13 and the low-pass filter 27. At the output of the phase shifter 23, a phase-shifted interference signal WSY is obtained which is also referred to below as wobble synchronization signal, which is synchronous with the modulation of the signal TELP, of the low-frequency component of the track error signal DPD-TE. The delay times $\tau_A$, $\tau_B$, $\tau_C$ and $\tau_D$ of the delay elements 26A, 26B, 26C and 26D, respectively, are set under the control of the control unit 24. For this purpose, the control unit 24 has an offset determining unit 44 and a comparison unit 45. The latter contains, in the exemplary embodiment, a differential sample-and-hold circuit DSH, a synchronous demodulator 33, a first window comparator 44 and a sample-and-hold circuit 35. This is followed by a first circuit block 36.

The signal WSY and the output signal TELP of the low-pass filter 27 are fed to a synchronous demodulator 33, which forms the absolute value from the modulation of the signal TELP and integrates it. If the modulation of the signal TELP and the wobble synchronization signal WSY are in phase, then the output voltage VA rises; if these signals are in antiphase, then the output voltage VA of the synchronous demodulator 33 falls. The output voltage VA is fed, on the one hand, to a first sample-and-hold circuit 35 and, on the other hand, to a differential sample-and-hold circuit DSH, which produces a voltage VD which is proportional to the temporal change of the voltage VA. The voltage VD thus differs from zero when the output voltage VA of the synchronous demodulator 33 changes with respect to time. It is equal to zero when the output voltage VA no longer changes with respect to time. This can be ascertained with the aid of a window comparator 34 to which the comparison voltages ±VRD are applied, which may be fixedly predetermined or else, advantageously, may be adaptively matched. The output signal NMT of the said window comparator thus indicates when the track error signal DPD-TE no longer has modulation which is synchronous with the frequency of the interference signal S.

The sample-and-hold circuit 35 is firstly switched to sample, that is to say "follow voltage", VAS=VA, by a control signal S/H1 which is emitted by a controller (not illustrated). The output voltage VAS of the sample-and-hold circuit 35 is fed to a circuit block 36, which forms the absolute value ABS(A) and the SIGN(A) from the output voltage VAS. The sign SIGN(A) determines the pair of detector elements A and B or C and D to which the absolute value ABS(A) of the output voltage VAS is fed. To that end, the first switch 38 of the switching unit 37 is controlled by the sign signal SIGN(A). The circuit functions described thus enable the delay time $\tau_A$, $\tau_B$ or $\tau_C$, $\tau_D$ of a pair of detector elements A and B or C and D to be adjusted in such a way that the lens movement-dependent modulation of the track error signal DPD-TE is compensated for.

If this has been done, the voltage VAS is held by the first sample-and-hold circuit 35. There now remains only a constant offset in the track error signal DPD-TE, which can be compensated for only by adjusting in pairs the delay times of the delay elements A and C or B and D. This offset is implemented with the aid of the offset determining unit 44, which has an integrator 39, a window comparator 40 and a sample-and-hold circuit 41. The output thereof is followed by a second circuit block 42 in the exemplary embodiment.

For the purpose of offset compensation, an integrator 39 and a second window comparator 40 are connected to the output of the low-pass filter 27. The second window comparator 40 determines whether the filtered track error signal TELP has a DC voltage offset that is sufficiently small. Since this is normally not the case after the 1st compensation step, the lens movement compensation for the track error signal DPD-TE, the output voltage VB of the integrator 39 will change. A second sample-and-hold circuit 41, to whose input the output voltage VB is applied, is firstly switched to sample. The output voltage VBS of the sample-and-hold circuit 41 therefore follows the voltage VB. The second circuit block 42 determines absolute value ABS(B) and sign SIGN(B) from the output voltage VBS. The sign SIGN(B) governs, via jointly driven second switches 43 and 43', the pair of delay elements 26A and 26C or 26B and 26D to which an additional delay time is added. The absolute value ABS(B) of the voltage VB or VBS specifies by how much the respectively selected detector element pair is additionally delayed by means of the variable delay elements 26A–26D which can be set electrically. The voltage VB and thus the delay set for the pairs 26A and 26C or 26B and 26D therefore rise until the voltage TELP at the input of the integrator 39 becomes zero, that is to say the input voltage at the second window comparator 40 becomes smaller than the comparison voltage ±VRTE applied to the latter. This ensures that the offset voltage which is superposed on the track error signal DPD-TE is virtually zero. The last, that is to say optimum value of the voltage VB is then held in response to a corresponding signal S/H2 of the controller (not illustrated) to a corresponding signal NDT, as voltage VBS by the second sample-and-hold circuit 41. The compensation is thus ended. The interference signal S is now switched off and the tracking regulator 17 is switched on. The voltages VAS and VBS are held until a new compensation is initiated.

FIG. 4 shows, by way of example, a flow diagram according to which compensation of a device according to the invention in the abovementioned steps can take place; modifications thereof and other sequences corresponding to the steps described above are, of course, likewise within the scope of the invention.

After the start-up of the method in step 50, in step 51 the tracking regulator 17 is switched off and the interference signal generating unit 22 is switched on. As a result, the objective lens is wobbled in the manner described above. In step 52, the delay times $\tau_A$, $\tau_B$, $\tau_C$ and $\tau_D$ of the delay elements 26A, 26B, 26C and 26D are reset to an initial value, generally to zero. In order to form the track error signal DPD-TE, according to step 53 use is made of the time between the signals (A+C) and (B+D) which are output from the summation points 15 and 16 and are formed from the output signals of the detector elements A,B,C and D which are respectively routed via the delay elements 26A, 26B, 26C and 26D. In step 54, the modulation of the track error signal DPD-TE which is caused by the interference signal S is detected with the aid of the synchronous demodulator 33. In step 55, branching to step 56 takes place if the differential sample-and-hold circuit DSH still detects changes in the signal VA, that is to say if VA≠const. If there is no longer a change in the signal VA, then the method branches to step 57.

In step 56, the direction of the change, that is to say the fact of whether the modulation of the track error signal DPD-TE is in phase or in antiphase with the interference signal S, determines whether the method branches to step 58 or to step 59. In step 58, the delay times $\tau_C$ and $\tau_D$ of the delay elements 26C and 26D are increased, whereas those of the other two delay elements 26A and 26B are retained. In step 59, the delay times $\tau_A$ and $\tau_B$ are increased and the others remain unchanged. After steps 58 and 59, step 54 is carried out anew. This loop is passed through until the delay times that are set suffice to compensate for the modulation in the track error signal DPD-TE. In this case, the loop that has been described acts like an integration. If there is no longer a change in the output voltage VA of the synchronous demodulator 33, according to step 55 the method branches to step 57 and thus to the offset compensation.

An alternative way to change the delay times $\tau_A$ and $\tau_B$ or $\tau_C$ and $\tau_D$, respectively, is shown on the left side of FIG. 4 in steps 80 to 84, see dashed lines. Step 54 is in this alternative method modified in so far that the modulation of the track error signal DPD-TE which is caused by the interference signal S is detected and stored as a first modulation value. In step 80 two delay times, either $\tau_A$ and $\tau_B$ or $\tau_C$ and $\tau_D$, are changed by the same value. This value is preferably a preset value, which is adapted to the behaviour of the other components of the device so that best working is achieved. Step 81 is similar to step 54: the modulation of the track error signal DPD-TE which is caused by the interference signal S is detected and stored as a second modulation value.

According to a preferred solution, the method continues with step 82. However, it is also within the scope of the invention to branch according to the dash-dotted line to step 80, change again the same pair of delay times about a preset value, go to step 81 to detect the modulation and to store store it as a third modulation value. This loop may also be done several further times, so that n modulation values are stored. However, it is preferred to keep the number n small.

In step 82 the stored modulation values are compared to each other. As a result of the comparison, a the pair of delay times $\tau_A$ and $\tau_B$ or $\tau_C$ and $\tau_D$, respectively, which is to be changed next, is evaluated in step 83 as well as the suitable value for this change. In case that the relation between value of change of delay times and decrease in modulation caused by this change is a linear one or nearly linear, two stored modulation values are sufficient to determine the direction, i.e. the relevant pair of delay times, and the value of the next change. This is preferably done by means of a calculation or by means of a table. In case that the mentioned relation is not a linear one, it may also be possible to evaluate the direction and value from only two stored modulation values, e.g. by means of a table. In case that the result of this evaluation is not sufficient, it is proposed to take more than two stored modulation values as described above for the dash-dotted line.

In step 84 the delay times $\tau_A$ and $\tau_B$ or $\tau_C$ and $\tau_D$, respectively, of the pair of delay elements A,B or C,D which was determined in step 83 is changed about the value determined in step 83. As this value was determined to be sufficient to compensate for the influence of the lens movement, no further check in this way is necessary, the next method step is step 57 of the main example of the inventive method.

The advantage of the alternative embodiment described is that it can be carried out in a shorter time compared to the steps 55 to 59, because usually, the loop from step 54 via steps 55, 56 and 58 or 59 back to step 54 is to be done several times. The steps 80 to 84 are only taken once, probably the small loop of steps 80 and 81 is taken twice or a small number of times. But as the characteristic of the relation 'delay time change' to 'decrease in modulation' is known, the alternative method is, in most cases, faster than the main method described previously. The alternative method can be named an 'interpolation approach' because, from two or another small number of values the value of a last step to approach a desired result is interpolated, either by linear interpolation or a non-linear interpolation or by use of a suitable table.

An advantage of the main method described is that the characteristic of the abovementioned relation needs not to be known exactly and that, through the integration effect, the result is more exact. The integration effect is reached by the succession of small steps to approach the desired result. The main method can therefore also be named an 'iteration approach'. An advantageous method to reach quickly a more exact result is to combine both methods described, i.e. to combine the integration approach and the iteration approach. For example the value for the change of the delay times in step 58 or 59 is not a fixed value but can be determined from a comparison of two or more precedingly detected modulation values.

Following, there is described an iteration approach for compensation of an offset in the tracking error signal in steps 60 to 64 of FIG. 4. In analogy to the alternative method described above, here too, an integration approach is done preferably if a quick result is desired. Method steps similar to those described in steps 80 to 84 are then carried out following step 57 and preceding step 62 of FIG. 4. Here too, a combination of integration approach and iteration approach can advantageously be carried out to reach quickly an exact result.

In step 57, the set values $\tau_A$, $\tau_B$, $\tau_C$ and $\tau_D$ are stored. Two of these have the value zero, and the other two have a value which is greater than zero. In step 57, furthermore, the DC voltage offset is determined by means of the low-pass filter 27 and the second window comparator 40. If the DC voltage offset differs from zero, that is to say if TELP≠0, then the method branches to step 61. If the DC voltage offset is equal to zero within the bands of predetermined limits, the comparison voltages iVRTE in the exemplary embodiment, then the method branches to step 62. In step 61, the polarity of the DC voltage offset, that is to say the sign of the signal TELP, determines which pair of detector elements is additionally delayed. If TELP<0, then the method branches to step 63, otherwise to step 64. In step 63, an additional delay of the delay elements 26B and 26D is performed in that a value corresponding to the signal ABS(B) is added to the delay times $\tau_B$ and $\tau_D$ that have already been determined and stored. The other two delay times $\tau_A$ and $\tau_C$ remain unchanged. In step 64, an additional delay of the delay elements 26A and 26C is performed in that a value corresponding to the signal ABS(B) is added to the delay times $\tau_A$ and $\tau_C$ that have already been determined and stored. The other two delay times $\tau_B$ and $\tau_D$ remain unchanged. After steps 63 and 64, step 60 is carried out anew. This loop is passed through until increasing the delay times of the delay elements 26A and 26C or 26B and 26D has caused the DC voltage offset to be smaller than the comparison voltage ±VRTE of the window comparator 40. Repeated traversal of this loop and simultaneous incrementation acts like an integration in this case.

According to step 62, the delay times $\tau_A$, $\tau_B$, $\tau_C$ and $\tau_D$ that have been determined and set are stored and held. These stored values are the optimum compensation values. The method is therefore ended in step 65.

The flow diagram represented in FIG. 4 can be realized for example by a logic control in accordance with FIG. 5 in connection with the block diagram of a device according to the invention that is represented in FIG. 1. In this case, the logic AND gates are denoted by AND, the logic OR gates by OR and negation elements by N or NOT, and numerical details relate to the number of respective inputs. Separate reference symbols are assigned only when necessary.

As a result of the signal START, the compensation operation is started and the objective lens 3 is wobbled. Since modulation of the track error signal DPD-TE is normally present on account of lens movement, the signal NMT is at the logic level "low", with the result that the signal edge of the signal START switches the first sample-and-hold circuit 35 to "sample" by means of the signal S/H1 output by the first digital flip-flop 71. The second digital flip-flop 72 is reset by NMT="low", and the reset signal IRE for the integrator 39 is maintained for the DC voltage offset compensation. The start pulse for the second digital flip-flop 72 is likewise suppressed. The activation of the first sample-and-hold circuit 35 makes it possible for the first compensation step to proceed automatically, since the integrating component is already contained in the synchronous demodulator 33. The procedure of the first step ends when the voltage VA no longer changes with respect to time and, consequently, the voltage VD returns to the value zero.

The first compensation step is automatically avoided if the signal NMT is at logic level "high" from the beginning, that is to say the modulation of the track error signal DPD-TE is sufficiently small even without any delay of the output signals of the detector elements A and B or C and D. The output NMT of the window comparator 34 switches to "high", as a result of which the first digital flip-flop 71 is reset and the second digital flip-flop 72 is set. At the same time, the sample-and-hold circuit 35 is switched to "hold" and the voltage VAS for compensation of the modulation of the track error signal DPD-TE is stored. At the same time, the sample-and-hold circuit 41 is switched to "sample" and the integrator 39 is enabled via the signal IRE="low". The second compensation likewise proceeds automatically, owing to the integration, until the signal NDT assumes logic level "high".

As a result, the DC offset in the track error signal DPD-TE is also compensated and the end of the compensation is reached. If the DC offset is already equal to zero after the 1st compensation step, then the signal NDT already assumes level "high" at this point in time and the second step is skipped. The signal ADF outwardly indicates that the compensation is successfully effected and both modulation and offset are zero or are below a predetermined limit value. With the aid of the signal HOLDALL both sample-and-hold circuits 35, 41 can forcibly be held in the state HOLD, in order to store the voltages for the delay elements 26.

The sequence of the compensation in accordance with FIG. 5 is illustrated with the aid of a signal diagram in FIG. 6. The individual signals are designated in the same way as for FIGS. 1 and 5, and the time axis runs to the right. The phase shift between interference signal S and track error signal DPD-TE which is caused by Vernier drive 6 and low-pass filter 21 is assumed to be zero for the sake of simplicity. The settling time of the two compensation steps is also illustrated such that it is excessively short in comparison with the period of the wobbling frequency, for the sake of simplicity.

A simple realization of the control unit 24, comprising offset determining unit 44 as well as the comparison unit 45, by means of analogue components is specified in FIG. 7. This representation corresponds to the right-hand part of FIG. 1 and is also provided with the corresponding reference symbols. The functioning of the circuit illustrated is evident from the description specified above; therefore, the individual components such as operational amplifiers, etc., will not be discussed in further detail here.

In accordance with a further possible design (not illustrated here) of the invention, a circuit for determining the difference between the upper and lower envelopes of the track error signal DPD-TE is provided instead of the low-pass filter 27. This difference is minimal in the ideal case.

In a further variant of the invention which is likewise not illustrated here, a phase-independent synchronous rectifier with subsequent integration is provided instead of the phase shifter 23 and the synchronous demodulator 33. Even though the hardware is somewhat more complicated to realize in this case, this measure is recommended on account of the higher accuracy achieved thereby.

Since sample-and-hold circuits which operate with capacitors as charge stores cannot hold the voltage in a stable manner for a long time, on account of leakage currents, digitization of the values of the output voltages VA and VB and holding of the values at the digital level are provided as an advantageous development of the present invention. The voltages VAS and VBS are then in turn output after having been subjected to digital-to-analog conversion. In this case, the separation into absolute value and sign also advantageously take places at the digital level.

It is particularly advantageous to integrate the entire sequence of the method, that is to say all of the circuit blocks in the right-hand part of FIG. 1 and the blocks of FIG. 7, in a microcontroller. This necessitates a low-pass filter 27 or, as an alternative thereto, an envelope detector, see above. The output voltage TELP thereof is digitized by the microcontroller. The delay elements 26 are controlled via four digital-to-analog converters or, advantageously, in a directly digital manner. Since, as a rule, the microcontroller controls the focus and track servo in any case, it can likewise undertake wobbling of the Vernier drive 6 and comprise a phase-independent synchronous detector. This greatly minimizes the additional hardware outlay.

FIG. 8 shows part of a device according to the invention in a further embodiment with two variable delay elements 26A, 26B and two delay elements 26F having a fixed delay time. The part of the device that is illustrated replaces the corresponding part of the device illustrated in FIG. 1; identical elements are provided with the same reference symbols and are described separately only when they differ from what has been said further above. This applies analogously to the following figures as well.

The delay times $\tau_A$ and $\tau_B$ of the delay elements 26A and 26B can be shortened or prolonged on the basis of the fixed delay time $\tau_F$ of the delay elements 26F, with the result that either the signals of the detector elements A and B can be delayed with respect to those of the detector elements C and D, or vice versa. For this purpose, the signal VAS is applied to the delay elements 26A and 26B, which signal contains both absolute value and sign. Advantages of this refinement are, inter alia, that only two of the delay elements need be variable and that additional splitting of the signal VAS into sign and absolute value is not necessary.

FIG. 8 illustrates a further possible way of compensating for an offset: the signal VBS, which is output by the sample-and-hold circuit 41, is added to the output signal of the phase detector 14 at a summation point 75, the output signal of which is the track error signal DPD-TE. The offset compensation is thus effected after the summation points 15 and 16.

FIG. 9 shows part of a further embodiment of a device according to the invention. In this case, the offset compensation is likewise provided after the summation points 15, 16, but still before the phase detector 14 (not illustrated here). A switching unit 25 is switched in dependence on the signal SIGN(B) and causes the signal ABS(B) to be fed to one of two delay elements 26S, 26T. In this case, the delay element 26S is arranged between the summation point 15 and the phase detector 14, and the delay element 26T is arranged between the summation point 16 and the phase detector 14. The delay elements 26S, 26T can thus be connected by means of the switching unit 25 to the output signal VBS of the offset determining unit 44. It lies within the scope of the invention to provide, instead of two variable delay elements 26S, 26T at this point, in a similar manner to that described with regard to FIG. 8, one delay element having a fixed delay time and one variable delay element whose delay time is shortened or prolonged in comparison with the fixed delay time of the other delay element in dependence on the signal VBS.

In order to compensate for the error caused by lens movement, two variable delay elements 26X and 26Y, which can be connected by means of a switching unit 37' either to the detector elements A and B or to the detector elements C and D, are provided in FIG. 9. This ensures that either the signals of one pair A-B or those of the other pair C-D are delayed compared with the respective other pair. The switching unit 37' is switched by means of the signal SIGN(A), and the signal ABS(A) is applied to the delay elements 26X, 26Y.

FIG. 10 shows part of a device according to the invention of a further embodiment, which part serves for offset compensation. Here, too, the already added signals A+C and C+D are delayed between the summation points and 16, respectively, and the phase detector 14. For this purpose, a variable delay element 26U, to which the signal ABS(B) is applied, is inserted either into one or the other path by means of a switching unit 25'. The switching unit 25' switches in dependence on the signal SIGN(B). The two signals ABS(B) and SIGN(B) are derived, as described above, from the output signal VBS of the offset determining unit 44. An advantage of this refinement is that only a single variable delay element 26U is required.

It goes without saying that practical combinations of the individual refinements illustrated here for compensating for the error caused by lens movement and for compensating for the offset are likewise within the scope of the invention, even if they are not described in detail here.

What is claimed is:

1. A device for reading from or writing to optical recording media, said device comprising:
   a tracking unit, a four-quadrant detector, two summation points and a phase comparator for tracking in accordance with the differential phase detection method;
   a control unit;
   at least three delay elements including two variable delay elements which can be set by the control unit;
   an interference signal generating unit for generating an interference signal; and
   a wobble synchronization signal generating unit for generating a wobble synchronization signal in response to the interference signal, the wobble synchronization signal being coupled to a first input of the control unit, a second input of the control unit being connected to the output of the phase comparator.

2. The device according to claim 1, wherein the wobble synchronization signal generating unit comprises a phase shifter for phase shifting the interference signal for generating the wobble synchronization signal.

3. The device according to claim 2, wherein: the at least three delay elements includes first and second variable delay elements assigned to first and second detector elements, respectively, of the four-quadrant detector, and third and fourth delay elements having fixed delay time assigned to third and fourth detector elements, respectively.

4. The device according to claim 2, wherein the at least three delay elements includes four variable delay elements, a respective variable delay element being assigned to each of the detector elements of the four-quadrant detector, and a switching unit for connecting a detector element pair to a control output at which an output signal of the control unit is present.

5. The device according to claim 1, further comprising:
   a switching unit for connecting two of the detector elements of the four-quadrant detector to a respective variable delay element.

6. The device according to claim 2, wherein:
   the control unit has a comparison unit, to whose inputs the output signal of the phase comparator and the output signal of the interference signal generating unit are applied, and whose output signal serves for setting the variable delay elements.

7. The device according to claim 2, wherein:
   the control unit has an offset determining unit, to whose input the output signal of the phase comparator is applied, and whose output signal serves for setting at least one of the variable delay elements.

8. The device according to claim 7, wherein:
   at least one of the delay elements is arranged between a summation point for output signals of the detector elements of the four-quadrant detector and the phase comparator.

9. The device according to claim 8, wherein:
   a respective delay element is assigned to the summation points and in that a switching unit is present for connecting one of the delay elements to the output of the offset determining unit.

10. The device according to claim 8, wherein:
    a switching unit is present for inserting a delay element between one of the summation points and the phase comparator.

11. The device according to claim 2, wherein: the control output at which an output signal is present is assigned a circuit block, which determines at least one of absolute value and sign of the signal present at the control output.

12. A device for reading from or writing to optical recording media on which information items in the form of pits forming a track can be recorded, said device comprising:
    a light source for producing a light spot on the optical recording medium;
    a tracking unit for displacing the light spot essentially perpendicular to the track;
    a detector for detecting the light reflected from the optical recording medium, the detector having four detector areas, wherein a first detector area and a second detector area are separated from a third detector area and a fourth detector area by a line which is arranged essentially perpendicular to the track, and the first detector area and the fourth detector area are separated from the second detector area and from the third detector area by a line which is arranged essentially parallel to the track, and the first detector area being connected via a first variable delay element to a first summation point, whose other input is connected to the third detector area, and the second detector area being connected via a second variable delay element to a second summation point, whose other input is connected to the fourth detector area, and the outputs of the summation points being connected to a phase comparator, whose output signal is fed to a tracking regulator for regulating the tracking unit;

a control unit for setting the delay time being connected to the first variable delay element and to the second variable delay element in order to set their delay times;

an interference signal generating unit for generating an interference signal that is connected to the tracking unit; and a wobble synchronization signal generating unit for generating a wobble synchronization signal in response to the interference signal, the wobble synchronization signal being coupled to a first input of a comparison unit, whose second input is connected to an output of the phase comparator, and whose output is connected to the output of the control unit.

13. The device according to claim 12, wherein the wobble synchronization signal generating unit comprises a phase shifter for phase shifting the interference signal for generating the wobble synchronization signal.

14. A method for setting the delay times of delay elements of a device for reading from and/or writing to optical recording media, which device as a tracking unit, the delay elements being arranged between detector elements of a 4-quadrant detector and a unit for determining a track error signal, comprising the steps of:
   a) opening the tracking control loop;
   b) feeding an interference signal to the tracking unit;
   c) generating a wobble synchronization signal in response to the interference signal;
   d) comparing the track error signal and the wobble synchronization signal with one another;
   e) changing jointly the delay times of delay elements which are assigned to two neighbouring detector elements;
   f) repeating step e) if components of the interference signal in the track error signal lie above a specific limit value;
   g) turning off the interference signal; and
   h) retaining the delay times.

15. The method according to claim 14, wherein the step of generating the wobble synchronization signal comprises phase shifting the interference signal to generate the wobble synchronization signal.

16. The method according to claim 14, wherein:
   the interference signal is a periodic signal.

17. The method according to claim 15, wherein:
   the frequency of the periodic signal is below a resonant frequency of the tracking unit.

18. The method according to claim 15, wherein:
   step f) further comprises the steps:
   F1) detecting the component of the interference signal in the track error signal and comparing said component to the respective component of step c),
   F2) evaluating, from the result of the comparison, a value for the change of the delay times of selected delay elements which are assigned to two neighboring detector elements for jointly changing the respective delay times.

19. A method for setting the delay times of delay elements of a device for reading from and/or writing to optical recording media, which device has a tracking unit, the delay elements being arranged between detector elements of a 4-quadrant detector and a unit for determining a track error signal, comprising the following steps:
   a) opening the tracking control loop;
   b) feeding an interference signal to the tracking unit;
   c) checking the track error signal for the presence of an offset;
   d) changing the delay time of the delay element or elements which are assigned to two diagonally opposite detector elements if an offset is present;
   e) repeating step d) if the value of the offset lies above a predetermined limit value;
   f) turning off the interference signal; and
   g) retaining the delay times.

20. The device according to claim 2, wherein the at least three delay elements comprises first and second variable delay elements assigned to first and second detector elements, respectively, or to third and fourth detector elements, respectively, of the four-quadrant detector, and a third variable delay element assigned to a sum of the outputs of the first and third detector elements or to a second sum of the outputs of the second and fourth detector elements.

* * * * *